(12) United States Patent
Unno et al.

(10) Patent No.: US 11,198,918 B2
(45) Date of Patent: Dec. 14, 2021

(54) STAINLESS STEEL FOIL AND METHOD OF PRODUCTION OF SAME

(71) Applicant: NIPPON STEEL CHEMICAL & MATERIAL CO., LTD., Tokyo (JP)

(72) Inventors: Hiroto Unno, Tokyo (JP); Shinichi Terashima, Tokyo (JP); Toru Inaguma, Tokyo (JP); Koichi Nose, Tokyo (JP); Naoki Fujimoto, Tokyo (JP); Naoya Sawaki, Tokyo (JP); Shuji Nagasaki, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 145 days.

(21) Appl. No.: 15/119,194

(22) PCT Filed: Feb. 16, 2015

(86) PCT No.: PCT/JP2015/054178
§ 371 (c)(1),
(2) Date: Aug. 16, 2016

(87) PCT Pub. No.: WO2015/122523
PCT Pub. Date: Aug. 20, 2015

(65) Prior Publication Data
US 2017/0009312 A1 Jan. 12, 2017

(30) Foreign Application Priority Data
Feb. 17, 2014 (JP) .............................. JP2014-027849

(51) Int. Cl.
| | |
|---|---|
| *C21D 8/02* | (2006.01) |
| *C21D 1/74* | (2006.01) |
| *C21D 9/46* | (2006.01) |
| *C21D 9/00* | (2006.01) |
| *C25D 7/06* | (2006.01) |
| *B32B 15/18* | (2006.01) |
| *C21D 6/00* | (2006.01) |
| *C22C 38/40* | (2006.01) |
| *H01M 50/116* | (2021.01) |
| *C21D 8/00* | (2006.01) |

(52) U.S. Cl.
CPC ............ *C21D 9/0068* (2013.01); *B32B 15/18* (2013.01); *C21D 1/74* (2013.01); *C21D 6/002* (2013.01); *C21D 8/005* (2013.01); *C21D 8/0236* (2013.01); *C21D 8/0257* (2013.01); *C21D 8/0273* (2013.01); *C21D 9/46* (2013.01); *C22C 38/40* (2013.01); *H01M 50/116* (2021.01); *B32B 2457/10* (2013.01); *C21D 2211/001* (2013.01); *C21D 2211/005* (2013.01)

(58) Field of Classification Search
CPC .... C21D 8/0205; C21D 8/005; C21D 8/0236; C21D 8/0273; C21D 8/0257; C21D 1/74; C21D 1/76; C21D 9/48; C21D 9/0068; C21D 9/46; C21D 2211/005; C21D 2211/001; C22C 38/00; C25D 7/06; C25D 7/0614; B21B 1/40; B21B 2045/006; B32B 15/08; B32B 2457/10; B32B 15/18

USPC .......................................... 148/320; 428/606
See application file for complete search history.

(56) References Cited

U.S. PATENT DOCUMENTS

| | | | |
|---|---|---|---|
| 6,187,452 B1 | 2/2001 | Muto et al. | |
| 10,786,974 B2 * | 9/2020 | Unno | ...................... C22C 38/00 |
| 2002/0102348 A1 * | 8/2002 | Yagi | ..................... H01M 4/0426 |
| | | | 427/58 |
| 2009/0029245 A1 * | 1/2009 | Ibaragi | ..................... B32B 15/08 |
| | | | 429/176 |
| 2015/0013820 A1 * | 1/2015 | Taguchi | ................. C21D 8/105 |
| | | | 138/177 |

FOREIGN PATENT DOCUMENTS

| | | |
|---|---|---|
| CN | 101381842 A | 3/2009 |
| JP | 2000-273586 A | 10/2000 |
| | (Continued) | |

OTHER PUBLICATIONS

Machine translation of JP2004052100A, 29 pages. (Year: 2004).*

(Continued)

*Primary Examiner* — Matthew E. Hoban
*Assistant Examiner* — Lynne Edmondson
(74) *Attorney, Agent, or Firm* — Birch, Stewart, Kolasch & Birch, LLP

(57) ABSTRACT

The present invention has as its object to provide thickness 60 μm or less ultra-thin stainless steel foil which secures high thickness precision and simultaneously secures plastic deformability and good elongation at break, that is, secures good press-formability (deep drawability). The present invention solves this problem by ultra-thin stainless steel foil which has three or more crystal grains in a thickness direction, has a recrystallization rate of 90% to 100%, and has a nitrogen concentration of a surface layer of 1.0 mass % or less. For this reason, there is provided a method of production of stainless steel foil comprising rolling stainless steel sheet, then performing final annealing and making a thickness 5 μm to 60 μm, wherein a rolling reduction ratio at rolling right before final annealing is 30% or more, a temperature of final annealing after rolling is 950° C. to 1050° C. in the case of austenitic stainless steel and 850° C. to 950° C. in the case of ferritic stainless steel, and a nitrogen content in atmospheric gas in final annealing is 0.1 vol % or less, whereby ultra-thin stainless steel foil can be produced.

9 Claims, No Drawings

(56) References Cited

FOREIGN PATENT DOCUMENTS

| JP | 2004-52100 A | 2/2004 |
| JP | 2005-320587 A | 11/2005 |
| JP | 2007-168184 A | 7/2007 |
| JP | 2012-92360 A | 5/2012 |
| JP | 2012-92361 A | 5/2012 |
| JP | 2013-41788 A | 2/2013 |

OTHER PUBLICATIONS

International Search Report for PCT/JP2015/054178 dated May 19, 2015.
Written Opinion of the International Searching Authority for PCT/JP2015/054178 (PCT/ISA/237) dated May 19, 2015.

* cited by examiner

STAINLESS STEEL FOIL AND METHOD OF PRODUCTION OF SAME

TECHNICAL FIELD

The present invention relates to a thickness 60 µm or less stainless steel sheet (stainless steel foil). In particular, it relates to stainless steel foil comprised of extremely thin thickness stainless steel provided with workability and corrosion resistance.

BACKGROUND ART

Along with the increasingly smaller size and lighter weight of electronic equipment, electronic equipment has become more portable and mobile. Increasingly smaller size and lighter weight of the lithium ion batteries or other batteries which are mounted in many electronic equipment are being demanded. In particular, the increasingly smaller size and lighter weight of batteries which are sought for smart phones and other electronic equipment demand modern cutting edge level specifications.

At the present times, battery cases for lithium ion batteries for smart phone have been made using thin aluminum sheets in can shapes or aluminum foil laminated with resin films. In particular, aluminum foil laminated with resin film is being made much use of for the purpose of improving the density of content per volume. Recently, thinner sheaths have been sought for the purpose of further reducing the size and lightening the weight. However, in the base material aluminum foil, if made thinner, there were the problems that pinholes easily formed in the manufacturing process, the moisture barrier property could not be secured, and, further, due to the increased thinness, the piercing strength and rigidity fell, and the strength against impact from the outside or inside expansion of the battery could no longer be secured. For this reason, in aluminum foil, limits have appeared in terms of further reduction of size.

Therefore, stainless steel foil (ultra-thin thickness sheet of stainless steel) with a strength and rigidity higher than aluminum has been closely looked at. However, stainless steel is higher in specific gravity compared with aluminum, so stainless steel foil with extremely thin thickness has been sought. When used for a battery case, stainless steel foil has to be made thickness 60 µm or less ultra-thin stainless steel foil or else cannot be applied to the battery cases sought for current electronic equipment.

As ultra-thin stainless steel foil, PLT 1 discloses thickness 25 µm or less stainless steel foil. With ultra-thin stainless steel foil, voids are formed along with cracking in the rolling direction from the etched end faces. PLT 1 discloses an invention which restricts the number of 5 µm or more inclusions for eliminating this.

Further, as examples of application of stainless steel foil to battery cases, there are PLTs 2 to 4. PLT 2 discloses thickness 20 to 100 µm stainless steel foil, PLT 3 discloses thickness 100 µm stainless steel foil, and PLT 4 discloses thickness 40 to 150 µm stainless steel foil in examples of use press-formed to form battery sheaths.

CITATIONS LIST

Patent Literature

PLT 1: Japanese Patent Publication No. 2000-273586A
PLT 2: Japanese Patent Publication No. 2004-52100A
PLT 3: Japanese Patent Publication No. 2013-41788A
PLT 4: Japanese Patent Publication No. 2012-92361A
PLT 5: Japanese Patent Publication No. 2007-168184A

SUMMARY OF INVENTION

Technical Problem

Normally, ultra-thin stainless steel foil is often punched or etched such as for the springs used for the head suspensions of HDDs (hard disk drives). The art of PLT 1 solves the technical problems which occur in such etching.

However, in the case of a battery case, press-formability is demanded for pressing (deep drawability). Normal thickness 100 µm or more stainless steel foil, to improve workability, is annealed as a final step process at 1000° C. or so to lower the inside dislocation density and secure good elongation at break. However, if the thickness of the thick stainless steel foil becomes 60 µm or less, the plastic deformability remarkably falls and the press-formability (drawability) deteriorates. The present inventors engaged in intensive studies. As a result, they discovered that by applying conventional annealing to thickness 60 µm or less stainless steel foil, coarsening of crystal grains in the stainless steel foil is accelerated, whereby the number of crystal grains in the thickness direction ends up becoming one or two.

PLT 2 describes examples of press-forming thickness 20 to 100 µm stainless steel foil and applying it to battery cases. However, at the state of the art at the time, the press-formability of ultra-thin stainless steel foil with a thickness of below 60 µm was not recognized as an issue. No problem was grasped. In particular, however, there were the problems of the press-formability (plastic deformability) at the time of working the foil into a battery case and of peeling of the resin film at the corner parts of the battery case. If ending up using a battery case as is even with local plastic peeling, during long term contact with an electrolytic solution, peeling of plastic starting from that location ends up further proceeding and function as a battery case is obstructed.

PLT 3 also describes examples of application of thickness 100 µm stainless steel foil to battery cases. However, in thickness 100 µm stainless steel foil, no such problem arises relating to press-formability. Even if occurring, PLT 3 does not recognize any problem, so does not propose any solution.

PLT 4 describes examples of application of thickness 40 to 150 µm stainless steel foil to battery sheaths. The art of PLT 4 nitrides the surface layer of stainless steel foil to suppress the formation of work-induced martensite at the time of press-forming. Due to this, it explains that it is possible to secure resistance to peeling of the hot bonded parts of the stainless steel foil and plastic and suppress whitening of the plastic after press-forming. Furthermore, it explains that surface relief formed by work-induced martensite transformation is suppressed and the flatness of the surface is maintained, so the press-formability becomes good. However, if nitriding the surface of stainless steel foil, that part hardens, so it was learned that breaks (cracks) easily occur at the time of press-forming. In particular, if the thickness of the stainless steel foil becomes a 60 µm or less ultra-thin one, the effect of the parts hardened due to the surface nitridation becomes relatively great and can no longer be ignored. That is, if press-forming surface-nitrided ultra-thin stainless steel foil, cracks form at the surface and sufficient press-formability cannot be obtained, so problems still remain. In actuality, in PLT 4, in almost all examples, the thickness is 100 µm, so no remarkable problem is recognized in thickness 60 μm or less stainless steel foil. There is only one thickness 40 μm example and this was explained as the allowable range of deterioration of shapeability. Furthermore, there are no examples with thinner thickness, so the art which is descried in PLT 4 cannot be applied to 60 μm or less ultra-thin stainless steel foil.

The present inventor engaged in intensive studies and as a result discovered that in thickness 60 μm or less stainless steel foil (hereinafter, in this Description, unless otherwise indicated, referred to as "ultra-thin stainless steel foil"), as explained above, there end up to be one or two crystal grains in the thickness direction. This causes a decline in the plastic deformability, that is, deterioration of the press-formability. This first appears at a thickness of 60 μm or less and does not become a problem in stainless steel foil thicker than 60 μm. That is, with a conventional thickness, the foil is annealed at a relatively high temperature to secure good elongation at break and thickness precision to a sufficient extent, so inevitably the crystal grains coarsen. Even under such a situation, since the thickness of the foil is large, there are a constant number or more of crystal grains present in the thickness direction and there is no effect on deterioration of the plastic deformability.

Furthermore, the inventors discovered that even if the thickness is thin, it is possible to improve the press-formability by securing the above number of crystal grains while preventing nitridation of the surface layer. This is because the thinner the thickness, the greater the effect of hardening of the surface at the time if nitridation and the more breakage ends up being induced at the time of press-forming.

On the other hand, if annealing the steel at a somewhat low temperature for the purpose of suppressing coarsening of crystal grains, it is not possible to lower the dislocation density and not possible to secure good elongation at break. On top of this, the thickness precision also deteriorates. Further, as shown in PLT 4, even if nitriding the surface to make the crystal grains finer and reduce the surface relief shapes, if the thickness becomes 60 μm or less, the above problem due to nitridation of the surface layer arises.

Therefore, the present invention has as its object to provide thickness 60 μm or less ultra-thin stainless steel foil which secures high thickness precision, simultaneously secures plastic deformability and good elongation at break, that is, secures good press-formability (deep drawability). As a specific parameter, when it comes to ultra-thin stainless steel foil, since the surface roughness affects the thickness precision, to secure thickness precision, suppressing the surface roughness Rz to 1/10th of the thickness becomes desirable. Further, securing an elongation at break of 10% or more of the level of conventional stainless steel foil becomes desirable. Regarding plastic deformability as well, securing an equivalent level to conventional stainless steel foil becomes desirable.

Further, when made into a battery case, securing good resistance to electrolytic solutions (no peeling of resin film even with long term contact with electrolytic solution) becomes desirable. Note that, the lower limit of the thickness does not have to be particularly limited, but the limit of thickness with practical rolling is about 5 μm or so, therefore the thickness of the ultra-thin stainless steel foil which is covered by the present invention is made 5 to 60 μm.

Solution to Problem

To solve the above problem, the present inventors engaged in intensive studies and obtained the following findings:

(A) By securing three or more crystal grains in the thickness direction, plastic deformability is secured. Furthermore, the crystal grains should be refined. The lower limit of the number of crystal grains in the thickness direction should be determined in accordance with the thickness.

(B) To secure three or more crystal grains, it is sufficient to roll the steel by a high rolling reduction ratio at the time of rolling to increase the dislocations serving as sites forming nuclei and then anneal it.

(C) To secure an elongation at break of 10% or more, the steel should be annealed at a high temperature in accordance with the dislocation density and the recrystallization rate should be made 90% or more. Furthermore, to suppress breaks (cracks) due to surface hardening, it is important to suppress nitridation of the surface layer as much as possible.

(D) If simultaneously securing plastic deformability and elongation at break, it is possible to simultaneously secure a high thickness precision with a surface roughness (Rz (JIS B0601: 2001)) of 100 nm to 1/10 of the thickness.

(E) By securing three or more crystal grains in the thickness direction and furthermore making the nitrogen concentration at the surface layer 1.0 mass % or less, it is possible to secure resistance to electrolytic solutions. That is, to improve the resistance to electrolytic solutions, it is important to suppress skin roughness of the surface of stainless steel foil at the corner parts after press-forming and maintain bondability with resin films.

The present invention was made based on these findings and has as its gist the following:

(1) Stainless steel foil with a thickness of 5 μm to 60 μm, which has three or more crystal grains in a thickness direction, has a recrystallization rate of 90% to 100%, and has a nitrogen concentration of a surface layer of 1.0 mass % or less.

(2) Stainless steel foil according to (1), where the thickness is 5 μm to 40 μm.

(3) Stainless steel foil according to (1) or (2), wherein a surface roughness Rz is 100 nm or more and 1/10 or less of the thickness.

(4) Stainless steel foil according to any one of (1) to (3), wherein an elongation at break is 10% or more.

(5) Stainless steel foil according to any one of (1) to (4), wherein the stainless steel foil is ferritic stainless steel.

(6) Stainless steel foil according to any one of (1) to (4), wherein the stainless steel foil is austenitic stainless steel.

(7) Ultra-thin stainless steel foil according to any one of (1) to (6), wherein at least one surface of the stainless steel foil has a resin film laminated on it.

(8) A method of production of stainless steel foil comprising rolling stainless steel sheet, then performing final annealing and making a thickness 5 μm to 60 μm, in which method of production of stainless steel foil, a rolling reduction ratio at rolling right before final annealing is 30% or more in the case of austenitic stainless steel and 50% or more in the case of ferritic stainless steel, a nitrogen content in atmospheric gas in final annealing is 0.1 vol % or less, and a temperature of the final annealing is 950° C. to 1050° C. in the case of austenitic stainless steel and 850° C. to 950° C. in the case of ferritic stainless steel.

Advantageous Effects of Invention

The thickness 60 μm or less ultra-thin stainless steel foil according to the present invention can secure high thickness precision and can simultaneously secure plastic deformability and good elongation at break, that is, can secure good press-formability (deep drawability). Furthermore, it is possible to secure good resistance to electrolytic solutions when working the foil to a battery case. Due to these, it is possible to apply the foil to a battery case of a lithium ion battery etc. aimed at reducing size and lightening weight.

DESCRIPTION OF EMBODIMENTS

The present invention will be explained in detail below. Note that, unless otherwise indicated, the explanation will be given using austenitic stainless steel as an example.
[Thickness of 5 to 60 μm]
The stainless steel foil according to the present invention covers foil with a thickness of 5 to 60 μm. This is because if 60 μm or less, as explained above, the problems arising from the crystal grains surface. These problems become more conspicuous the thinner the thickness. Furthermore, since it is possible to contribute more to greater thinness of the battery case etc., the upper limit of the thickness covered may be limited to a direction of greater thinness. That is, preferably it may be limited to 50 μm or less, more preferably 40 μm or less, still more preferably 30 μm or less. Further, the lower limit of the thickness is not particularly limited. If considering the limits to manufacturing technology, a thickness of 5 μm may be made the lower limit. Even with a thickness of 5 μm, the effects of the present invention can be enjoyed.
[Three or More Crystal Grains in Thickness Direction]
The ultra-thin stainless steel foil according to present invention has three or more crystal grains in the thickness direction. The number of crystal grains in the thickness direction may be obtained by measuring the crystal grain size at any cross-section in the thickness direction based on JIS G0551 to calculate the average crystal grain size, dividing the thickness by the average crystal grain size, and using the quotient as the number of crystal grains in the thickness direction. Note that, when the crystal grains are equiaxed grains, it is also possible to measure a surface perpendicular to the thickness direction and calculate the average crystal grain size. Alternatively, the number is found by drawing any three or more lines at any cross-section in the thickness direction, counting the number of crystal grains which these lines cross, and finding the arithmetic average of these. At that time, if the crystal grains contact the surface, they are counted as 0.5 grains. Further, when a line runs along a crystal grain boundary, the plurality of crystals which form the crystal grain boundary may be respectively counted. However, the two end parts of stainless steel foil in the width direction are easily affected by annealing, so are not suited for measurement of the number of crystal grains. For this reason, it is preferable to exclude the two end parts of stainless steel foil in the width direction, draw any line in the thickness direction, and measure the number of crystal grains along it. For example, it is possible to count the number of crystal grains at three locations of the center of the stainless steel foil in the width direction (position of ½ width from one side) and between the two ends and the center (two positions of ¼ width and ¾ width from one end) and obtain the arithmetic average of these so as to evaluate the number of crystal grains in the thickness direction of the stainless steel foil.
The thus found number of crystal grains should be three or more. In order for the individual crystal grains to plastically deform to any shape, it is necessary to satisfy the condition of von Mises and have a plurality of slip systems cause multilayer slip. However, if the number of crystal grains in the thickness direction is small, the probability of the crystal grains in a direction not satisfying the condition of von Mises with respect to the deformation direction (crystal grains inferior in deformation ability) becoming aligned in the thickness direction becomes higher. This being so, at the time of press-forming, these crystal grains cannot keep up with deformation of the foil as a whole, so end up becoming starting points of breakage. On the other hand, if there are three or more crystal grains in the thickness direction, even if there are crystal grains which are inferior in deformation ability, the surrounding crystal grains can deform to any shapes and the deformation of the foil as a whole can be maintained, so as a result the plastic deformability is improved.
Furthermore, the inventors redoubled their studies and discovered that if determining the number of crystal grains in the thickness direction in accordance with the steel type or thickness, it is possible to secure the plastic deformability better. Austenitic stainless steel is easier in work hardening compared with ferritic stainless steel, so is large in deformation resistance. Further, the thicker the thickness, the greater the deformation resistance. For this reason, from the viewpoint of securing the plastic deformability, the number of crystal grains of the austenitic stainless steel should be increased. Further, the greater the thickness, the greater the number of crystal grains should be made.
In the case of austenitic stainless steel, if the thickness is 15 μm or more, the number of crystal grains in the thickness direction is preferably five or more. In particular, when the thickness is 40 μm or more, the number is more preferably 10 or more. On the other hand, even in the case of ferritic stainless steel, for similar reasons, the number is preferably four or more when the thickness is 15 μm or more, particularly preferably five or more when it is 40 μm or more. Due to this, it is possible to further improve the plastic deformability. In the case of ultra-thin stainless steel foil with a thickness of 15 μm or less, The effect of the steel type and the thickness on the number of crystal grains in the thickness direction becomes an extent which cannot be ignored.
The upper limit of the number of crystal grains is not particularly limited. This is because the number of crystal grains in the thickness direction changes according to the thickness of the ultra-thin stainless steel foil. If the number of crystal grains is three or more, the size of the crystal grains (crystal grain size based on JIS G0051 (hereinafter, in the Description, unless otherwise indicated, referred to as "crystal grain size")) is not particularly limited. This is because the above explained multiple slip is determined not by the size of the crystal grains, but by the number of crystal grains in the thickness direction.
[Recrystallization Rate of 90% to 100%]
The ultra-thin stainless steel foil according to present invention has to be refined in crystal grain size to secure plastic deformability, but with that alone, the above problems cannot be solved. Further, to secure good elongation at break, the dislocation density has to be adjusted to a suitable level. Specifically, by the structure after rolling being worked, dislocations and other lattice defects accumulate, so even if the crystal grains are fine, the dislocation density is high. For this reason, it is necessary to perform heat treatment to cause recrystallization and lower the dislocation density and simultaneously suppress coarsening of the crystal grains. For this reason, it is necessary to suitably control the heat treatment conditions in accordance with the material. That is, the recrystallized structure is formed using the dislocation density as a driving force, so it is possible to utilize the reduction of the dislocation density in the recrystallized grains while suppressing coarsening the recrystallized structure so as to secure plastic deformability while securing good elongation at break. Further, for the dislocation density, there are the etch pit method and other measurement methods, but the results are affected by the measurement conditions etc., so quantitative measurement is difficult. It is also possible to directly measure the dislocation density, but this depends on the observation field, so the variation becomes large. Therefore, the present inventors discovered that by measuring the recrystallization rate, it is possible to obtain a grasp on whether suitable heat treatment has been performed.

The recrystallization rate can be calculated by (area of recrystallized crystals)/(observed area). The "area of recrystallized crystals" can be obtained by observing any cross-section of the ultra-thin stainless steel foil under an optical microscope. Alternatively, X-ray analysis may be used to find the half valve width of the $\gamma$ (220) peak or $\alpha$ (211) peak and obtain the recrystallization rate deeming the recrystallization rate to be 90% or more if the half value width is 0.20 deg or less, deeming the recrystallization rate to be 95% or more if 0.15 deg or less, and deeming the recrystallization rate to be 100% if 0.10 deg or less.

The ultra-thin stainless steel foil according to present invention need only have a recrystallization rate of 90% or more. If the recrystallization rate is 90% or more, it is possible to eliminate excess dislocations. On top of this, it is possible to secure the required number of crystal grains. Preferably, the recrystallization rate is 95% or more. If the recrystallization rate is 95% or more, even if the thickness is thin, the press-formability (plastic deformability) is raised and the surface roughness is also improved. The upper limit of the recrystallization rate may be 100%. If the number of crystal grains in the thickness direction is secured in the prescribed number, there is no problem even if the foil is recrystallized as a whole.

[Nitrogen Concentration of Surface Layer]

As explained above, if nitriding the surface of the stainless steel foil, various problems arise when the thickness becomes thin. Therefore, the surface layer of the stainless steel foil is preferably not nitrided. The nitrogen concentration of the surface layer should be made 1.0 mass % or less. Here, the "surface layer" is made the thickness when the oxygen concentration becomes half of the peak value in measurement by the Auger electron spectroscopy, while the nitrogen concentration is made the average concentration at the surface layer.

While repeating the explanation again, if the surface layer of the stainless steel foil is nitrided, the surface layer becomes harder due to nitridation at the time of press-forming and thereby ends up forming starting points for break, so the press-formability ends up falling. This is an issue which becomes notable since if the thickness is a thin 60 μm or less, the effect at the surface becomes relatively large. By making the nitrogen concentration the above range, it is possible to deform the foil without causing breaks (cracks) at the surface layer, so if there are three crystal grains in the thickness direction, good press-formability is obtained. For this reason, the surface layer of the stainless steel foil is preferably not concentrated in nitrogen. The nitrogen concentration of the surface layer may be made 1.0 mass % or less. The lower limit of nitrogen concentration of the surface layer does not have to be particularly set. The lower limit becomes equal to the nitrogen content evaluated for the stainless steel foil as a whole. That is, a level of nitrogen content of an unavoidable impurity becomes the lower limit in the case of a type of steel not containing nitrogen such as the general SUS304, SUS430, etc. To make the nitrogen concentration of the surface layer of the stainless steel foil 1 mass % or less, the nitrogen concentration in an annealing atmosphere can be controlled to 0.1 vol % or less.

[Surface Roughness Rz of 100 nm or More and ¹⁄₁₀ of Thickness or Less]

To secure the above number of crystal grains in the thickness direction and recrystallization rate, the steel is rolled by a high rolling reduction ratio and is finally annealed at a relatively high temperature. By going through these processes, it was confirmed that the surface roughness Rz was 1000 nm or less even with a normal product with gloss and was 6000 nm or less even with a dull finish product with no gloss at the surface. Further, "Rz" is expressed by the difference in the thickness direction of the most recessed parts and most projecting parts as prescribed in JIS B0601: 2001. Of course, the lower the upper limit of the surface roughness the better, but this depends on the actual process conditions. The surface roughness Rz of the ultra-thin stainless steel foil according to present invention can be improved to ¹⁄₁₀ or less of the thickness. If the surface roughness Rz is ¹⁄₁₀ or less of the thickness, stable press-formability (plastic deformability) can be secured. The lower limit of the surface roughness Rz is not particularly set. However, it is not practical to make the surface roughness Rz 0 nm, so the minimum value which can be realistically obtained, that is, 100 nm, may be made the lower limit.

In general, when annealing ultra-thin stainless steel foil, the stainless steel foil has to have plastic deformability or else by running the foil through the rolls during the annealing, waviness is formed or breakage occurs and damage of the foil is led to. Further, unless the elongation at break of the stainless steel foil becomes larger, it becomes difficult to flatten relief shapes at the surface. Therefore, the rolling rolling reduction ratio and the final annealing temperature affect the surface roughness.

In the present invention, if rolling the steel by a high rolling reduction ratio, then annealing it at a relatively high temperature matching with the dislocation density, the crystal grains become finer and therefore plastic deformation in the thickness direction becomes easier. On top of this, the higher elongation can be prevented from causing damage to the foil. As a result, it is believed high thickness precision can be secured.

On the other hand, even if rolling by a high rolling reduction ratio, if subsequently annealing at a relatively low temperature, even if the crystal grains become finer, the dislocation density cannot be sufficiently decreased. For this reason, the elongation at break ends up becoming less than 10%, so the relief shapes of the surface become harder to flatten and a surface roughness Rz of 6000 nm or less cannot be secured.

Further, if annealing at a relatively high temperature without rolling by a high rolling reduction ratio, the annealing is performed in a state without sites forming nuclei for recrystallization being sufficiently obtained, so the crystal grain size coarsens and the number of crystal grains in the thickness direction ends up becoming about two. For this reason, plastic deformation in the thickness direction ends up becoming difficult, so by running the foil through the rolls during annealing, waviness is formed or breakage etc. occurs.

Further, if further annealing the steel by a relatively low temperature without rolling by a high rolling reduction ratio, in the same way as the above reasons, plastic deformation becomes difficult in the thickness direction. On top of this, the elongation at break ends up becoming less than 10%. For this reason, due to the foil being run through the rolls during the annealing process, waviness is formed or breakage occurs. On top of this, it becomes harder to flatten the relief shapes at the surface of the ultra-thin stainless steel foil.

[Elongation at Break of 10% or More]

The elongation at break is an overall parameter of the workability and relates to plastic deformability and dislocation density. The dislocation density is closely related to the annealing temperature, so if the final annealing temperature is 950° C. or more, an elongation at break of 10% or more can be secured. Furthermore, the ultra-thin stainless steel foil according to the present invention also secures plastic deformability, so it was confirmed that the elongation at break is excellent.

The elongation at break is heavily dependent on the annealing temperature. It was confirmed that a rate of elongation at break of the ultra-thin stainless steel foil according to the present invention of 10% or more in the case of an annealing temperature of 950° C. and of 20% or more in the case of an annealing temperature of 1050° C. can be secured.

The larger the elongation at break the better. The upper limit is not particularly limited. The maximum value of the realistic elongation at break is 50% or so, so this may be made the upper limit.

[Material of Stainless Steel]

The ultra-thin stainless steel foil according to the present invention is not particularly restricted in material so long as stainless steel. It may be SUS304 or other austenitic steel or may be SUS430 or other ferritic steel. However, in the case of ferritic stainless steel, compared with austenitic steel, the suitable temperature of annealing becomes about 100° C. lower. Considering this point, according to the method of production of the ultra-thin stainless steel foil according to the present invention, it was confirmed possible to obtained predetermined characteristics both with austenitic steel and with ferritic steel.

[Laminate]

The ultra-thin stainless steel foil according to present invention, in the same way as normal laminated stainless steel foil, may have a resin film laminated on its surface to make a laminated ultra-thin stainless steel foil. By laminating a resin film, it is possible to improve the corrosion resistance in an electrolytic solution and possible to better improve the applicability to a battery case of a lithium ion battery etc. The resin film may be laminated on both surfaces of the stainless steel foil or may be laminated on one of the surfaces.

Regarding the peel strength of stainless steel foil and plastic, the necessary performance is obtained by providing a chromate layer of a suitable thickness on the surface of the stainless steel foil. For example, PLT 5 discloses the art of providing at least one surface of stainless steel foil with a thickness 2 to 200 nm chromate layer and laminating on its surface a polyolefin-based resin which contains functional groups which have polarity. Further, whitening of the plastic after press-formation can be prevented by optimizing the design of the plastic. Specifically, the plastic after hot lamination may be made amorphous. For this reason, the cooling speed at the time of hot lamination may be made faster. For example, the cooling speed from 120° C. to 80° C. in range may be made 20° C./s or more.

[Method of Production]

Next, a method of production of ultra-thin stainless steel foil according to the present invention will be explained. The process of production of the ultra-thin stainless steel foil according to present invention is generally the same as the process of production of normal stainless steel foil. That is, a stainless steel strip is rolled to a foil, then is cleaned at its surface, is final annealed, and is temper rolled in accordance with need (tension leveler) to obtain the final product. Note that, the foil rolling process can be divided into a plurality of processes (multistage rolling) in accordance with the thickness of the steel steel strip of the material which is used for foil rolling and process annealing may be performed between the individual foil rolling processes. However, to obtain the ultra-thin stainless steel foil according to present invention, as explained above, it is important to control the rolling reduction ratio in the final foil rolling and the temperature at the final annealing.

[Rolling Reduction Ratio]

In foil rolling, by rolling by a high rolling reduction ratio, it is possible to introduce dislocations serving as sites forming nuclei for recrystallization in stainless steel. The higher the rolling reduction ratio, the more the dislocations which are introduced are increased. The dislocation density is controlled to match with the annealing which is later performed. Therefore, if performing foil rolling two times or more, the final foil rolling, that is, the foil rolling right before the final annealing, should be performed with a high rolling reduction ratio.

In the case of ferritic stainless steel, compared with austenitic stainless steel, work hardening becomes difficult, that is, the dislocation density becomes harder to increase, so high reduction is necessary. The rolling reduction ratio should be made 50% or more. Further, if possible it is preferably made 60% or more, more preferably 70% or more.

The extent of dislocations which are introduced due to rolling differs depending on the steel type. For example, in the case of ferritic stainless steel, compared with austenitic stainless steel, work hardening becomes difficult and the dislocation density becomes harder to increase, so high reduction is necessary. For this reason, the rolling reduction ratio with foil rolling before final annealing should be made 50% or more. From the viewpoint of securing the dislocation density, it preferably should be made 60% or more, more preferably should be made 70% or more.

On the other hand, in the case of austenitic stainless steel, it is not necessary to raise the rolling reduction ratio as much as with ferritic stainless steel. The rolling reduction ratio in foil rolling before final annealing should be made 30% or more. From the viewpoint of securing dislocation density, the rate should be made preferably 40% or more, more preferably should be made 45% or more.

Note that, the rolling reduction ratio is defined by the following formula:

Rolling reduction ratio=(thickness before rolling−thickness after rolling)/(thickness before rolling)

In foil rolling, if reducing the thickness of course, the object becomes the introduction of dislocations, so the upper limit of the rolling reduction ratio is not particularly limited. However, theoretically, a rolling reduction ratio of 100% is impossible, so the practical upper limit of the rolling reduction ratio is about 95%. The lower limit of the rolling reduction ratio, while depending on the final thickness of the ultra-thin stainless steel foil as well, is preferably made 40% or more if possible, more preferably 45% or more.

If dividing the foil rolling into a plurality of operations, it is also possible to produce the material by an intermediate foil rolling and succeeding process annealing operation. In this case as well, the thinking is the same as that of the final foil rolling. That is, the rolling reduction ratio at each foil rolling operation may be made 30% or more. However, as explained above, foil rolling right before final annealing is most effective, so the rolling reduction ratio of the final foil rolling may be set higher than the rolling reduction ratio of other foil rolling operations.

[Annealing Temperature]

The annealing after foil rolling (final annealing) performs the important role of reducing the dislocation density and causing recrystallization. The ultra-thin stainless steel foil according to the present invention, as explained above, has as its object to adjust the dislocation density to simultaneously secure the plastic deformability and good elongation at break.

In the case of the ultra-thin stainless steel foil according to the present invention, if austenitic stainless steel, the annealing temperature should be made 950° C. to 1050° C. If less than 950° C., the dislocation density is not reduced, so good elongation at break cannot be secured. On the other hand, if over 1050° C., the crystals become coarser, the number of crystal grains in the thickness direction decrease, and plastic deformability cannot be obtained. To secure good elongation at break and improve the press-formability (plastic deformability) as well, the lower limit of the annealing temperature tends to become good if somewhat higher than 950° C., so preferably is made 960° C., more preferably is made 970° C.

The upper limit of the annealing temperature is somewhat lower than 1050° C. and preferably 1040° C., more preferably 1030° C. from the viewpoint of suppressing coarsening of the crystals. Similarly, if ferritic stainless steel, the annealing temperature should be made 850° C. to 950° C. If 850° C. or less, the dislocation density is not deceased, so good elongation at break cannot be secured. On the other hand, if over 950° C., the crystals become coarser, the number of crystal grains in the thickness direction is decreased, and plastic deformability cannot be obtained. To secure good elongation at break and improve the press-formability (plastic deformability) as well, the lower limit of the annealing temperature tends to be good if somewhat higher than 850° C., so preferably is made 860° C., more preferably is made 870° C. The upper limit annealing temperature also should be made somewhat lower than 950° C., preferably is made 940° C., more preferably is made 930° C., from the viewpoint of suppressing coarsening of the crystal.

[Annealing Holding Time]

The time for holding the stainless steel foil at the above-mentioned annealing temperature may be made 3 seconds to 30 seconds. If less than 3 seconds, the heat treatment becomes insufficient, the recrystallization does not sufficiently advance, and the recrystallization rate is not obtained. On the other hand, if over 30 seconds, the recrystallized grains become coarser and the number of crystal grains in the thickness direction decreases, so sufficient plastic deformability cannot be obtained.

[Annealing Atmosphere]

The annealing atmosphere is made a hydrogen or argon or other rare gas atmosphere so that the surface of the stainless steel foil is not nitrided. Note that, the nitrogen in the annealing atmosphere is preferably not contained at all, but nitrogen which enters unavoidably from the atmosphere can be allowed to a certain extent. To make the nitrogen concentration at the surface layer 1.0 mass % or less, the nitrogen concentration in the annealing atmosphere should be 0.1 vol % or less.

[Process Annealing]

When performing the foil rolling process a plurality of times, the process annealing conditions are not particularly limited, but in the same way as final annealing, in the case of austenitic steel, the temperature is preferably 950° C. to 1050° C., while in the case of ferritic steel, it is preferably 850° C. to 950° C. The crystal grain boundaries also form nuclei for recrystallization. A large number are preferably introduced before foil rolling. Therefore, it is preferable to make the temperature the above-mentioned temperature range so as to suppress coarsening of the recrystallized grains.

EXAMPLES

Examples

As examples of the ultra-thin stainless steel foil according to present invention, commercially available SUS304 (austenitic stainless steel) and SUS430 (ferritic stainless steel) were rolled under the rolling conditions which are described in Table 1 by a foil rolling machine to produce ultra-thin stainless steel foils which have thicknesses which are described in Table 1.

Here, the "cold rolling rolling reduction ratio" indicates the rolling reduction ratio in the foil rolling process right before the final annealing, the "final annealing temperature" indicates the temperature at the final annealing process which is performed after the end of the rolling process, and the "holding time" indicates the time of holding the stainless steel foil at the final annealing temperature. The annealing atmosphere was made a mixed gas of 0.1 vol % nitrogen and 99.9 vol % hydrogen or a mixed gas of 25 vol % nitrogen and 75 vol % hydrogen.

The recrystallization rate was obtained by polishing a cross-section in the rolling direction to a mirror finish to obtain an observed surface, etching and observing it, finding the area of crystal grains which were recrystallized in a range of the total thickness×constant width, and calculating (area of recrystallized crystals)/(observed area).

The nitrogen concentration at the surface layer was obtained by measurement by Auger electron spectroscopy (AES). The span from the stainless steel foil surface to a 30 nm depth was measured and the average nitrogen concentration down to a depth where the nitrogen concentration became half of the peak value was used as the nitrogen concentration at the surface layer.

The number of crystal grains in the thickness direction was obtained by cutting a test piece in the thickness direction, polishing the cross-section, then etching it, examining it by a microscope, then measuring sizes of crystal grains based on JIS G0551 to calculate the average crystal grain size, then dividing the thickness by the average crystal grain size and using the quotient.

The elongation at break was evaluated by cutting out a JIS No. 13B test piece from the produced stainless steel foil and testing it for tensile strength by a test method based on JIS 22241. The thickness precision was obtained by evaluating the maximum height Rz by a commercially available probe type surface roughness measuring device based on JIS B0601.

Further, using each stainless steel foil after final annealing, providing a 10 nm chromate layer on one surface, laminating polypropylene film on it, and laminating polyester film or nylon film on the other surface, approximately 100 mm square samples were prepared. At the centers of these samples, vertical 40 mm×horizontal 30 mm punches were used for press-forming under conditions of a clearance of 0.3 mm and evaluated for maximum depths where no wrinkles or cracks occurred. The results of evaluation are shown in Table 1. As shown in Table 1, the examples of ultra-thin stainless steel foil according to the present invention all had shaping depths of 4 mm or more secured. Further, elongations at break of 10% or more were also secured. Furthermore, the surface roughnesses Rz were high 0.8 μm (800 nm) in the examples of the present invention. It was learned that extremely high thickness precisions could be secured.

On the other hand, Comparative Examples 2 to 5 had high final annealing temperatures inviting coarsening of the crystals, so "breaks" occurred in the press-forming (deep drawing). In particular, Comparative Examples 2 and 3 were low in rolling reduction ratios and insufficient in introduction of dislocations so there were insufficient sites for forming nuclei for recrystallization. Along with this, the numbers of crystal grains in the thickness direction were small. This is believed to the cause. Comparative Examples 6 to 10 were low in final annealing temperatures and were not advanced in recrystallization, so the elongations at break became extremely small. Comparative Examples 11 and 16 had annealing atmospheres containing nitrogen in 0.1 vol % or more, so the concentrations of nitrogen at the surface layers ended up exceeding 1 mass % and sufficient shaping depths could not be obtained. Reference Examples 1 and 12 are examples of thickness 100 μm stainless steel foil. Reference Example 1 had a relatively high annealing temperature, but the thickness was thick and recrystallization was not advanced. However, since the thickness is great, the number of crystal grains at the cross-section is nine and both the elongation at break and shapeability are secured to a certain extent. Reference Example 11 is an example where both the elongation at break and shaping depth are extremely good since the recrystallization rate is 100%. If in this way the thickness is thick such as in the conventional stainless steel foil, the elongation at break becomes good and the plastic deformability is secured, so it will be understood that the problem of the present invention does not arise.

Note that, Examples 20 to 29 and Comparative Examples 13 to 16 are examples according to SUS430. In the comparison of SUS304 and SUS430, it was confirmed that except for the suitable annealing temperature range, there was no particularly great difference in the properties.

Further, the resistance to electrolytic solutions was evaluated for part of the stainless steel foils in Table 1-1 and Table 1-2. First, on one surface of the stainless steel foil, a thickness 20 nm chromate layer was provided, then a polypropylene film was laminated. Furthermore, on the other surface of the stainless steel foil, a polyethylene terephthalate film was laminated to prepare a 100 mm square sample. At the center, a vertical 40 mm×horizontal 30 mm punch was used to press-form it to a shaping depth which is described in Table 1-1 or Table 1-2 under conditions of a clearance of 0.3 mm so that the polypropylene film surface becomes the punch side. The sample formed into the shape of a battery case in this way was immersed in an electrolytic solution and held there at 85° C. for 168 hours. Note that, for the electrolytic solution, a solvent comprised of ethylene carbonate, dimethyl carbonate, and diethyl carbonate mixed in a ratio of 1:1:1 was used to dilute the lithium hexafluorophosphate ($LiPF_6$) to a 1 mol/liter concentration, then 1000 ppm of water was added to degrade it. This was used for an accelerated test. After that, the presence of peeling at the polypropylene film side of the die R part was visually evaluated. The results of evaluation are indicated as "Good" in Table 1-1 and Table 1-2 when no peeling can be found, as "Poor" when peeling is confirmed, and as "–" when the resistance to electrolytic solutions were not evaluated.

Note that, the method of production of the ultra-thin stainless steel foil according to the present invention is not particularly limited to the above method. Ultra-thin stainless steel foil which satisfies the requirements limited in the present invention falls in the scope of the present invention and exhibits the effects of the present invention needless to say.

TABLE 1-1

| Test no. | Steel type | Sheet thickness μm | Cold rolling rolling reduction ratio % | Finishing annealing Temp. ° C. | Holding time sec | Atmosphere vol % | No. of crystal grains in sheet thickness direction | Surface layer nitrogen conc. Mass % |
|---|---|---|---|---|---|---|---|---|
| Ex. 1 | SUS304 | 20 | 60 | 950 | 5 | 0.1%$N_2$—99.9%$H_2$ | 3.4 | 0.8 |
| Ex. 2 | SUS304 | 20 | 60 | 960 | 5 | 0.1%$N_2$—99.9%$H_2$ | 3.2 | 0.6 |
| Ex. 3 | SUS304 | 20 | 60 | 970 | 5 | 0.1%$N_2$—99.9%$H_2$ | 3.0 | 0.7 |
| Ex. 4 | SUS304 | 20 | 80 | 950 | 5 | 0.1%$N_2$—99.9%$H_2$ | 5.0 | 0.8 |
| Ex. 5 | SUS304 | 20 | 50 | 950 | 3 | 0.1%$N_2$—99.9%$H_2$ | 6.0 | 0.8 |
| Ex. 6 | SUS304 | 25 | 50 | 1050 | 5 | 0.1%$N_2$—99.9%$H_2$ | 3.3 | 0.7 |
| Ex. 7 | SUS304 | 25 | 80 | 1050 | 5 | 0.1%$N_2$—99.9%$H_2$ | 10.0 | 0.8 |
| Ex. 8 | SUS304 | 25 | 50 | 970 | 5 | 0.1%$N_2$—99.9%$H_2$ | 8.9 | 0.5 |
| Ex. 9 | SUS304 | 25 | 50 | 1000 | 5 | 0.1%$N_2$—99.9%$H_2$ | 7.9 | 0.6 |
| Ex. 10 | SUS304 | 25 | 50 | 1025 | 5 | 0.1%$N_2$—99.9%$H_2$ | 6.9 | 0.5 |
| Ex. 11 | SUS304 | 5 | 50 | 1000 | 3 | 0.1%$N_2$—99.9%$H_2$ | 3.0 | 0.4 |
| Ex. 12 | SUS304 | 10 | 50 | 1000 | 5 | 0.1%$N_2$—99.9%$H_2$ | 4.0 | 0.4 |
| Ex. 13 | SUS304 | 15 | 50 | 970 | 30 | 0.1%$N_2$—99.9%$H_2$ | 5.0 | 0.5 |
| Ex. 14 | SUS304 | 30 | 30 | 1050 | 5 | 0.1%$N_2$—99.9%$H_2$ | 7.8 | 0.7 |
| Ex. 15 | SUS304 | 30 | 40 | 1050 | 5 | 0.1%$N_2$—99.9%$H_2$ | 9.7 | 0.7 |
| Ex. 16 | SUS304 | 30 | 45 | 1000 | 15 | 0.1%$N_2$—99.9%$H_2$ | 10.7 | 0.6 |
| Ex. 17 | SUS304 | 40 | 50 | 970 | 10 | 0.1%$N_2$—99.9%$H_2$ | 11.0 | 0.5 |
| Ex. 18 | SUS304 | 50 | 80 | 1025 | 5 | 0.1%$N_2$—99.9%$H_2$ | 10.0 | 0.8 |
| Ex. 19 | SUS304 | 45 | 90 | 1000 | 5 | 0.1%$N_2$—99.9%$H_2$ | 11.8 | 0.7 |
| Ex. 20 | SUS430 | 10 | 50 | 850 | 4 | 0.1%$N_2$—99.9%$H_2$ | 3.4 | 0.3 |
| Ex. 21 | SUS430 | 20 | 50 | 870 | 4 | 0.1%$N_2$—99.9%$H_2$ | 3.5 | 0.2 |
| Ex. 22 | SUS430 | 20 | 70 | 900 | 3 | 0.1%$N_2$—99.9%$H_2$ | 4.1 | 0.3 |

TABLE 1-1-continued

| | | | | | | | | |
|---|---|---|---|---|---|---|---|---|
| Ex. 23 | SUS430 | 30 | 50 | 900 | 4 | 0.1%N$_2$—99.9%H$_2$ | 3.3 | 0.3 |
| Ex. 24 | SUS430 | 30 | 50 | 950 | 4 | 0.1%N$_2$—99.9%H$_2$ | 3.5 | 0.2 |
| Ex. 25 | SUS430 | 30 | 80 | 900 | 4 | 0.1%N$_2$—99.9%H$_2$ | 5.2 | 0.2 |
| Ex. 26 | SUS430 | 35 | 95 | 900 | 4 | 0.1%N$_2$—99.9%H$_2$ | 5.8 | 0.3 |
| Ex. 27 | SUS430 | 40 | 90 | 870 | 10 | 0.1%N$_2$—99.9%H$_2$ | 6.0 | 0.3 |
| Ex. 28 | SUS430 | 50 | 80 | 900 | 4 | 0.1%N$_2$—99.9%H$_2$ | 8.5 | 0.3 |
| Ex. 29 | SUS430 | 60 | 60 | 925 | 4 | 0.1%N$_2$—99.9%H$_2$ | 8.3 | 0.5 |

| Test no. | Recrystal. rate % | Elong. at break % | Surface roughness Rz μm | Shaping depth mm | Breakage | Resistance to electrolytic solution |
|---|---|---|---|---|---|---|
| Ex. 1 | 100 | 10 | 0.79 | 4.2 | None | Good |
| Ex. 2 | 100 | 14 | 0.77 | 4.3 | None | Good |
| Ex. 3 | 100 | 18 | 0.75 | 4.4 | None | Good |
| Ex. 4 | 100 | 14 | 0.79 | 5.3 | None | Good |
| Ex. 5 | 95 | 14 | 0.78 | 5.4 | None | Good |
| Ex. 6 | 100 | 22 | 0.79 | 4.8 | None | Good |
| Ex. 7 | 100 | 47 | 0.79 | 6.0 | None | Good |
| Ex. 8 | 90 | 32 | 0.73 | 5.6 | None | Good |
| Ex. 9 | 95 | 38 | 0.71 | 5.7 | None | Good |
| Ex. 10 | 100 | 44 | 0.68 | 5.8 | None | Good |
| Ex. 11 | 100 | 10 | 0.10 | 4.2 | None | Good |
| Ex. 12 | 100 | 12 | 0.24 | 4.5 | None | Good |
| Ex. 13 | 100 | 14 | 0.41 | 4.6 | None | Good |
| Ex. 14 | 95 | 22 | 0.93 | 5.0 | None | Good |
| Ex. 15 | 100 | 27 | 0.80 | 5.5 | None | Good |
| Ex. 16 | 100 | 29 | 0.85 | 5.6 | None | Good |
| Ex. 17 | 100 | 35 | 0.75 | 5.8 | None | Good |
| Ex. 18 | 100 | 42 | 0.57 | 6.5 | None | Good |
| Ex. 19 | 100 | 48 | 0.68 | 6.0 | None | Good |
| Ex. 20 | 95 | 14 | 0.65 | 4.0 | None | Good |
| Ex. 21 | 95 | 22 | 0.77 | 4.1 | None | Good |
| Ex. 22 | 100 | 23 | 0.76 | 4.2 | None | Good |
| Ex. 23 | 100 | 30 | 0.74 | 4.3 | None | Good |
| Ex. 24 | 100 | 27 | 0.80 | 4.3 | None | Good |
| Ex. 25 | 100 | 32 | 0.77 | 4.5 | None | Good |
| Ex. 26 | 100 | 30 | 0.76 | 4.5 | None | Good |
| Ex. 27 | 100 | 34 | 0.72 | 4.6 | None | Good |
| Ex. 28 | 100 | 32 | 0.78 | 4.6 | None | Good |
| Ex. 29 | 100 | 25 | 0.82 | 4.8 | None | Good |

TABLE 1-2

| Test no. | Steel type | Sheet thickness μm | Cold rolling reduction ratio % | Finishing annealing Temp. °C. | Holding time sec | Atmosphere vol % | No. of crystal grains in sheet thickness direction | Surface layer nitrogen conc. Mass % |
|---|---|---|---|---|---|---|---|---|
| Ref. Ex. 1 | SUS304 | 100 | 20 | 1050 | 5 | 0.1%N$_2$—99.9%H$_2$ | 9.0 | 0.5 |
| Comp. Ex. 2 | SUS304 | 15 | 10 | 1100 | 5 | 0.1%N$_2$—99.9%H$_2$ | 0.5 | 0.6 |
| Comp. Ex. 3 | SUS304 | 20 | 25 | 1050 | 5 | 0.1%N$_2$—99.9%H$_2$ | 1.2 | 0.5 |
| Comp. Ex. 4 | SUS304 | 25 | 50 | 1100 | 5 | 0.1%N$_2$—99.9%H$_2$ | 2.0 | 0.5 |
| Comp. Ex. 5 | SUS304 | 30 | 40 | 1100 | 5 | 0.1%N$_2$—99.9%H$_2$ | 2.5 | 0.7 |
| Comp. Ex. 6 | SUS304 | 20 | 60 | 650 | 5 | 0.1%N$_2$—99.9%H$_2$ | 6.4 | 0.5 |
| Comp. Ex. 7 | SUS304 | 30 | 50 | 800 | 5 | 0.1%N$_2$—99.9%H$_2$ | 9.6 | 0.5 |
| Comp. Ex. 8 | SUS304 | 30 | 20 | 650 | 5 | 0.1%N$_2$—99.9%H$_2$ | 7.4 | 0.4 |
| Comp. Ex. 9 | SUS304 | 50 | 80 | 650 | 5 | 0.1%N$_2$—99.9%H$_2$ | 16.0 | 0.6 |
| Comp. Ex. 10 | SUS304 | 45 | 90 | 900 | 5 | 0.1%N$_2$—99.9%H$_2$ | 15.0 | 0.5 |
| Comp. Ex. 11 | SUS304 | 20 | 30 | 1050 | 5 | 25%N$_2$—75%H$_2$ | 3.0 | 5.0 |
| Ref. Ex. 12 | SUS304 | 100 | 70 | 1150 | 5 | 0.1%N$_2$—99.9%H$_2$ | 20.0 | 0.5 |

TABLE 1-2-continued

| | | | | | | | | |
|---|---|---|---|---|---|---|---|---|
| Comp. Ex. 13 | SUS430 | 20 | 50 | 600 | 4 | 0.1%N$_2$—99.9%H$_2$ | 6.5 | 0.6 |
| Comp. Ex. 14 | SUS430 | 30 | 10 | 900 | 4 | 0.1%N$_2$—99.9%H$_2$ | 1.8 | 0.5 |
| Comp. Ex. 15 | SUS430 | 30 | 50 | 1000 | 4 | 0.1%N$_2$—99.9%H$_2$ | 2.1 | 0.5 |
| Comp. Ex. 16 | SUS430 | 30 | 50 | 950 | 4 | 25%N$_2$—75%H$_2$ | 3.1 | 3.0 |

| Test no. | Recrystal. rate % | Elong. at break % | Surface roughness Rz μm | Shaping depth mm | Breakage | Resistance to electrolytic solution |
|---|---|---|---|---|---|---|
| Ref. Ex. 1 | 60 | 10 | 0.90 | 3.9 | None | Good |
| Comp. Ex. 2 | 100 | 9 | 1.34 | 2.5 | Break | Poor |
| Comp. Ex. 3 | 100 | 10 | 0.85 | 2.8 | Break | Poor |
| Comp. Ex. 4 | 100 | 20 | 0.78 | 3.5 | Break | Poor |
| Comp. Ex. 5 | 100 | 20 | 0.70 | 3.9 | Break | Poor |
| Comp. Ex. 6 | 0 | 3 | 6.50 | 2.5 | None | Poor |
| Comp. Ex. 7 | 0 | 5 | 6.70 | 3.0 | None | Poor |
| Comp. Ex. 8 | 0 | 1 | 6.45 | 2.8 | None | Poor |
| Comp. Ex. 9 | 0 | 3 | 6.65 | 3.5 | None | Poor |
| Comp. Ex. 10 | 50 | 8 | 6.70 | 3.9 | None | Poor |
| Comp. Ex. 11 | 100 | 15 | 0.84 | 3.5 | None | Poor |
| Ref. Ex. 12 | 100 | 41 | 0.96 | 7.0 | None | Good |
| Comp. Ex. 13 | 0 | 5 | 3.50 | 2.1 | None | Poor |
| Comp. Ex. 14 | 100 | 10 | 1.20 | 2.2 | Break | Poor |
| Comp. Ex. 15 | 100 | 15 | 0.90 | 2.5 | None | Poor |
| Comp. Ex. 16 | 100 | 17 | 0.85 | 2.1 | None | Poor |

INDUSTRIAL APPLICABILITY

The ultra-thin stainless steel foil according to the present invention can be applied to battery cases of lithium ion batteries for use for small-sized electronic equipment etc.

The invention claimed is:

1. Stainless steel foil with a thickness of 5 μm to 40 μm, which has a number of crystal grains of three or more in a thickness direction, has a recrystallization rate of 90% to 100%, and has a nitrogen concentration of a surface layer of 1.0 mass % or less, and
    wherein a surface roughness Rz is 100 nm or more and 1/10 or less of the thickness, and
    wherein the number of crystal grains in the thickness direction is obtained by measuring the crystal grain size at any cross-section in the thickness direction based on JIS G0551 to calculate the average crystal grain size, dividing the thickness by the average crystal grain size.

2. The stainless steel foil according to claim 1, wherein an elongation at break is 10% or more.

3. The stainless steel foil according to claim 1, wherein said stainless steel foil is ferritic stainless steel.

4. The stainless steel foil according to claim 1, wherein said stainless steel foil is austenitic stainless steel.

5. The stainless steel foil according to claim 1, wherein at least one surface of said stainless steel foil has a resin film laminated on it.

6. A method of production of stainless steel foil according to claim 1 comprising rolling stainless steel sheet, then performing final annealing and making a thickness 5 μm to 40 μm and a surface roughness Rz of 100 nm or more and 1/10 or less of the thickness, the method of production of stainless steel foil comprises two or more times of rolling, wherein a rolling reduction ratio at rolling right before final annealing is 30% or more in the case of austenitic stainless steel and 50% or more in the case of ferritic stainless steel, a nitrogen content in atmospheric gas in final annealing is 0.1 vol % or less, and a temperature of said final annealing is 950° C. to 1050° C. in the case of austenitic stainless steel and 850° C. to 950° C. in the case of ferritic stainless steel.

7. The stainless steel foil according to claim 2, wherein said stainless steel foil is ferritic stainless steel.

8. The stainless steel foil according to claim 2, wherein said stainless steel foil is austenitic stainless steel.

9. The stainless steel foil according to claim 2, wherein at least one surface of said stainless steel foil has a resin film laminated on it.

* * * * *